3,385,815
POLYVINYL ALCOHOL PLASTICIZED WITH THE REACTION PRODUCT OF POLYHYDRIC ALCOHOL AND ETHYLENE OXIDE
Toshihiko Yoshitake, Kiyokazu Imai, Shunji Miyake, and Ichiro Nitta, Kurashiki-shi, Japan, assignors to Kurashiki Rayon Co., Ltd., Kurashiki-shi, Japan, a corporation of Japan
No Drawing. Filed Feb. 9, 1965, Ser. No. 431,470
Claims priority, application Japan, Feb. 21, 1964, 39/9,528
6 Claims. (Cl. 260—33.2)

ABSTRACT OF THE DISCLOSURE

A water-soluble, solid polyvinyl alcohol resin having incorporated therein a plasticizer relatively unaffected by high temperature and humidity. The plasticizer is the water-soluble reaction product of a polyhydric alcohol and ethylene oxide, the ratio of ethylene oxide to polyhydric alcohol being 1 to less than 20 moles of ethylene oxide per mole of polyhydric alcohol.

---

This invention relates to plasticized polyvinyl alcohol resin compositions. More particularly, this invention concerns the plasticization of polyvinyl alcohol resins by including therein the reaction product of a polyhydric alcohol having at least 3 hydroxyl groups with an alkylene oxide to provide pliable and non-sweating compositions suitable for use as films, sheets and molding compounds.

Materials such as glycerine, butylene glycol and diethylene glycol etc. have heretofore been used as plasticizers for polyvinyl alcohol resins. These agents can however be undesirably influenced by high humidity since the compounded resins tend to sweat. Moreover, when the compositions are subjected to increasing temperatures these plasticizers, due to their relatively high vapor pressure, may be lost from the resin. As a result, the plasticized polyvinyl alcohol resins whether in film, sheet or molded form, have an increasing tendency to deform with the passage of time. These undesirable properties have discouraged the use of the plasticized resins.

In the present invention, we have incorporated in a polyvinyl alcohol resin a plasticizing agent which is a reaction product of a polyhydric alcohol having at least 3 hydroxyl groups with an alkylene oxide. Combinations of such plasticizing agents can also be employed. In the plasticized material the reaction product of the polyhydric alcohol and alkylene oxide forms a sufficient part of the composition to effect satisfactory plasticization and the agent may be used in conventional amounts such as 1 to 200% by weight of the polyvinyl alcohol resin. The plasticized polyvinyl alcohol resins are relatively unaffected by high temperature and humidity, and the compositions exhibit toughness at low temperatures and are relatively non-sweating at high humidity conditions. Moreover, the plasticized resins are transparent and pliable and relatively resistant to deformation even over long periods of time. As a further feature of the present invention, the plasticized compositions may contain along with the reaction product of the polyhydric alcohol and the alkylene oxide, conventional plasticizers employed in polyvinyl alcohol resin compositions. Thus, the manufacture of improved polyvinyl alcohol resins of film, sheet and molded form is now made possible which should lead to more extensive use of the resins.

The polyhydric alcohols suitable for making the plasticizer of this invention include glycerine, pentaerythritol, sorbitol, etc. and their mixtures, e.g. containing 2 or 3 of such alcohols. The alcohols commonly are alkanols containing 3 to 6 carbon atoms and 3 to 6 hydroxyl groups. The most readily available alkylene oxide is ethylene oxide and this is the agent we normally employ. The alcohol and alkylene oxide reagents are readily reacted to give our plasticizing agent and the reaction is facilitated by the use of a strong alkali catalyst. Suitable catalysts include the hydroxides and methoxides of the alkali metals such as potassium hydroxide, caustic soda, sodium methoxide, and potassium methoxide.

In preparing the reaction product of this invention, a mixture of the polyhydric alcohol and catalyst can be heated to a temperature of above 50° C. at which the alcohol and catalyst are in the liquid state. After heating the polyhydric alcohol and catalyst, the alkylene oxide as a gas or liquid can then be added to the mixture. Thus the gas can be blown into the liquid mixture of alcohol and catalyst or the liquid alkylene oxide can be dropped into the liquid mixture of alcohol and catalyst. Any gaseous alkylene oxide passing from the reaction mixture may be recovered, for instance by condensation, and may be returned for reuse in the reaction. By this reaction we combine from 1 to less than 20 moles of alkylene oxide per mole of polyhydric alcohol to provide reaction products suitable for plasticizing polyvinyl alcohol resins in accordance with this invention. To determine the amount of alkylene oxide combined with the alcohol the reaction can readily be followed since as the alkylene oxide combines the volume of the liquid reaction medium increases and this effect can be observed macroscopically. After the desired reaction is completed, an acid such as hydrochloric acid may be added to neutralize the alkali catalyst and the resulting reaction medium can be used directly as the plasticizer for the polyvinyl alcohol resin.

The reaction product of the polyhydric alcohol and alkylene oxide of the present invention is a polyhydric alcohol having one or more ether oxygen atoms and is believed to be a mixture of compounds of generally similar chemical composition. In any event the product is a water-soluble, viscous liquid having a relatively high boiling point and low solidifying point. For example, a reaction product obtained by the combination of 1.1 moles of ethylene oxide with 1 mole of glycerine exhibited a boiling point above 150° C. at 3 mm. of mercury.

The polyvinyl alcohol resins of the compositions of the present invention are known water-soluble resins. These materials include polyvinyl alcohol resins which are completely saponified or partially saponified, as well as partially-acetalized polyvinyl alcohol resins and other copolymerized resins consisting primarily of polyvinyl alcohol.

The following examples will serve to illustrate the present invention.

Example I 0.5 gm. of potassium hydroxide was added to 10 gms. of glycerine and the mixture was heated to form a solution. The liquid was maintained at 150° C. while gaseous ethylene oxide was blown into the mixture for 2 hours at the rate of 100 cc. per minute. As a result 15.4 gms. of a highly viscous liquid was obtained. The liquid was a reaction product resulting from the combination of ethylene oxide and glycerine in the mole ratio of 1.15 to 1. The reaction product was then neutralized by the addition of hydrochloric acid and the neutralized material was added in an amount of 15% by weight to a polyvinyl alcohol resin having a 1700 degree of polymerization.

The resin-reaction product combination was dissolved in water and formed into a film. The film was transparent and extremely tough having a 16.30 kg./mm. Elmendorf-type tear strength measured in an atmosphere of 40% relative humidity at 20° C. The film was non-sweating even at high humidity and no deformation of the plasticized composition was noted after a lapse of time.

Example II 0.5 gm. of potassium hydroxide was added to a mixture of 5 gms. of glycerine and 5 gms. of pentaerythritol. The resulting mixture was heated and formed into a solution. When the liquid was at a temperature of 150° C. gaseous ethylene oxide was blown into the liquid over a period of 4 hours at the rate of 100 cc. per minute to form 17.7 gms. of a viscous liquid. This product resulted from the combination of ethylene oxide and the mixture of glycerine and pentaerythritol in the ratio of 1.92 moles of ethylene oxide to 1 mole of the combined polyhydric alkanols.

The reaction product was formed into a film in the manner of Example I and the film was transparent. At 20° C. in a 40% relative humidity atmosphere the film had an Elmendorf-type tear strength of 14.42 kg./mm. The film was extremely tough, non-sweating under high humidity and underwent no change over a period of time.

Example III

According to the method of Example I a reaction product of ethylene oxide and glycerine combined in the ratio of 2 moles to 1 mole, respectively, was obtained and was then neutralized with hydrochloric acid. The reaction product was added in an amount of 25% by weight to a polyvinyl alcohol resin having a 1700 degree of polymerization. The mixture was then dissolved in water and made into a sheet 2 mm. in thickness by means of an extruder. The tensile strength of the sheet thus obtained was 9.0 kg./cm.$^2$ at 20° C. and 65% relative humidity. The sheet was extremely strong and tough, and non-sweating even under high humidity and indicated no change over a period of time. The sheet is highly useful for articles such as belts, straps, tablewares and the like.

We claim:

1. A water-soluble, solid polyvinyl alcohol resin having incorporated therein as a plasticizer a water-soluble reaction product of polyhydric alcohol selected from the group consisting of polyhydric alcohols of 3 to 6 carbon atoms and 3 to 6 hydroxyl groups and mixtures thereof and ethylene oxide, the ratio of ethylene oxide to polyhydric alcohol in said reaction product being 1 to less than 20 moles of ethylene oxide per mole of polyhydric alcohol.

2. The composition of claim 1 wherein the polyhydric alcohol is glycerine.

3. The composition of claim 1 wherein the polyhydric alcohol is a mixture of glycerine and pentaerythritol.

4. A composition of matter consisting essentially of a water-soluble, solid polyvinyl alcohol resin and a plasticizer which is a water-soluble reaction product of polyhydric alkanol selected from the group consisting of polyhydric alcohols of 3 to 6 carbon atoms and 3 to 6 hydroxyl groups and mixtures thereof and ethylene oxide, the ratio of ethylene oxide to polyhydric alkanol in said reaction product being 1 to less than 20 moles of ethylene oxide per mole of polyhydric alcohol.

5. The composition of claim 4 wherein the polyhydric alkanol is glycerine.

6. The composition of claim 4 wherein the polyhydric alkanol is a mixture of glycerine and pentaerythritol.

References Cited

UNITED STATES PATENTS

| | | | |
|---|---|---|---|
| 2,706,207 | 4/1955 | Schnell et al. | 260—615 |
| 3,082,257 | 3/1963 | Karabinos et al. | 260—615 |
| 3,267,174 | 8/1966 | Fry et al. | 260—33.2 |

MORRIS LIEBMAN, *Primary Examiner.*

L. T. JACOBS, *Assistant Examiner.*